(12) United States Patent
Salowey (10) Patent No.: US 6,895,501 B1
(45) Date of Patent: May 17, 2005

(54) METHOD AND APPARATUS FOR DISTRIBUTING, INTERPRETING, AND STORING HETEROGENEOUS CERTIFICATES IN A HOMOGENOUS PUBLIC KEY INFRASTRUCTURE

(75) Inventor: Joseph A. Salowey, Seattle, WA (US)

(73) Assignee: WRQ, Inc., Seattle, WA (US)

( * ) Notice: Subject to any disclaimer, the term of this patent is extended or adjusted under 35 U.S.C. 154(b) by 0 days.

(21) Appl. No.: 09/524,272

(22) Filed: Mar. 13, 2000

(51) Int. Cl.[7] .............................................. H04L 9/00
(52) U.S. Cl. ...................................................... 713/168
(58) Field of Search ................... 713/168; 717/168–174

(56) References Cited

U.S. PATENT DOCUMENTS

| | | | |
|---|---|---|---|
| 5,657,390 A | | 8/1997 | Elgamal et al. |
| 5,724,425 A | | 3/1998 | Chang et al. |
| 5,850,451 A | * | 12/1998 | Sudia ........................ 380/286 |
| 5,870,544 A | | 2/1999 | Curtis |
| 5,924,096 A | * | 7/1999 | Draper et al. ................ 707/10 |
| 5,951,636 A | * | 9/1999 | Zerber ........................ 709/202 |
| 6,023,764 A | | 2/2000 | Curtis |

OTHER PUBLICATIONS

Web site information, HTTP://ei.cs.vt.edu, Sureshkumar, Vijay, "Java Security", last modified Sep. 22, 1996.

Web site information, HTTP://java.sun.com. Dageforde, Mary, "The Java Tutorial" "Providing Your Own Security Manager" "Java Security API" (Feb. 2, 2000) "Java Development Kit (JDK) 1.1.x—Signed Applet Example".

Hopwood, David, "A Comparison between Java and ActiveX Security" (Oct. 10, 1997).

Gong, Li et al., "Going Beyond the Sandbox: An Overview of the New Security Architecture in the Java Development Kit 1.2," In *Proceedings of the USENIX Symposium on Internet Technologies and Systems*, Monterey, California (Dec. 1997).

Web site information, HTTP://www.javasoft.com/security, Erdos, Marlena et al., "Security Reference Model for the Java Developer's Kit 1.0.2" (Jan. 13, 1996) Yellin, Frank, "Low Level Security in Java" (copyright 1996).

Dean, Drew et al., "Java Security: From HotJava to Netscape and Beyond," *1996 Symposium on Security and Privacy*, Oakland, CA(May 6–8, 1996).

Sureshkumar, Vijay, "Java Security," *WWW Beyond the Basics*, http://ei.cs.vt.edu (1996).

(Continued)

Primary Examiner—Gregory Morse
Assistant Examiner—Jacob Lipman
(74) Attorney, Agent, or Firm—Nixon & Vanderhye P.C.

(57) ABSTRACT

A connection is established between a server and a web browser having access to a first, trusted public key. The server downloads a digitally signed archive to the browser, the archive including a second public key. The browser verifies the digitally signed archive using the first public key, and stores the second public key in response to the verification. The browser then uses the stored second public key to authenticate the server and establish a secure connection with the server. The second public key and its chain of trust need not be known by the browser beforehand, and the archive may include program fragments that store the key in an area where the browser (or an applet running under the browser) can access and use it. The archive may also include a program fragment that performs certificate validation for the client—enabling the client to handle certificate types it does not know about. Advantages include allowing the archive to be transmitted over any insecure connection since it is integrity protected and authenticated; and allowing the client to make a direct connection to the server without having to access certificate stores on the platform.

18 Claims, 4 Drawing Sheets

OTHER PUBLICATIONS

Dageforde, Mary, "Trail: Security in JDK 1.1," Tutorial, http://java.sun.com.

"Providing Your Own Security Manager," Tutorial, http://java.sun.com.

Java Security API, "The Source For Java Technology," http://java.sun.com.

Hopwood, David, "A Comparison between Java and ActiveX Security," http://www.users.zetnet.co.uk.

Gong, Li, et al., "Going Beyond The Sandbox: An Overview Of The New Security Architecture In The Java Development Kit 1.2," *Proceedings of the USENIX Symposium on Internet Technologies and Systems*, Monterey, California (Dec. 1997).

Erdos, Marlena, et al., "Security Reference Model for the Java Developer's Kit 1.0.2," http://www.javasoft.com (Nov. 13, 1996).

Yellin, Frank, "Low Level Security in Java," http://www.javasoft.com (1996).

Dean, Drew, et al., "Java Security: From HotJava to Netscape and Beyond," to appear in the 1996 *IEEE Symposium on Security and Privacy*, Oakland, California, May 6–8, 1996.

"Java Development Kit (JDK) 1.1x—Signed Applet Example," http://java.sun.com/security.

* cited by examiner

Fig. 1 TRADITIONAL PKI
*(PRIOR ART)*

Fig. 2 HETEROGENEOUS PKI
*(PRIOR ART)*

Fig. 5    EXAMPLE ARCHIVE

METHOD AND APPARATUS FOR DISTRIBUTING, INTERPRETING, AND STORING HETEROGENEOUS CERTIFICATES IN A HOMOGENOUS PUBLIC KEY INFRASTRUCTURE

FIELD

This invention relates to digital certificates using cryptography, and more particularly, to techniques and systems for processing different types of digital certificates within a homogenous public key infrastructure.

BACKGROUND AND SUMMARY

It used to be that code to be executed on a personal computer or a workstation was usually supplied by physically inserting a diskette, optical disk or other storage medium into a local drive associated with the personal computer or workstation. Now, such code can simply be downloaded over a computer network. One of the more significant developments in network-based software downloading over the last few years has been the development of JAVA applets and the JAVA® virtual machine—which allow programs to be dynamically downloaded for execution on an as-needed basis.

Briefly, an applet is a small executable code module that normally doesn't have the complete features and user interface of a normal application. The applet runs inside of an application (for example, a standard web browser) within a "virtual machine"—that is, a set of computer resources and instructions that make up a generally standardized environment for the applet's execution. JAVA is the language most commonly associated with applets, and standard web browsers and other applications include JAVA-based virtual machines to run JAVA applets.

Such applets provide a convenient mechanism for flexibly providing client-side functionality. They can provide all sorts of functionality on the client side—everything from graphics support to game play to database lookups to security functions and more. Since JAVA is a general purpose language, virtually any functionality can be expressed in an applet.

This same flexibility and general purpose functionality creates a security risk. Generally, running a program on a computer usually gives the program access to the computer's resources. The program therefore has the capability of doing things that could damage the user's computer or invade the user's privacy. If the user knows that the program comes from a trusted source, the user can have confidence that the program will not do anything harmful. But an applet downloaded from a web site the user happens to run across when "surfing the web" is untrusted and could be malicious.

An initial solution to this problem was to provide a security model that denied downloaded (i.e., remote originating) applets access to certain system resources (e.g., writing to the computer's disk)—and limited them instead to a very restricted environment called the "sandbox". Under this security model, local code is trusted to have full access to vital system resources such as the file system, whereas downloaded remote code is not trusted and can access only the limited resources provided within the "sandbox."

A problem with this initial security model was that it drastically limited the type of functionality that remote code could provide. By denying remote code access to critical system resources, the system was protected but the remote code could only perform a limited set of functions that did not require such resources.

The JAVA security model evolved to provide a way to determine whether a downloaded remote applet could be trusted. This security check relies on something called a "digital signature." A digital signature is like a handwritten signature in the sense that it can be used to verify the authenticity of the item the signature is attached to. The JAVA security model can compare the digital signature with a "digital certificate" to confirm that the digital signature is authentic. The "digital certificate" is obtained from a trusted source, and specifies a "public key" (and possibly other information) about the originator of the remote applet. Just as your bank can compare a handwritten signature you provided when you opened your bank account to a handwritten signature on a bank check to verify that you authorized payment, the JAVA security model compares a "digital certificate" with a "digital signature" used to "sign" a remote applet to verify that the applet has come from a trusted source.

Most digital signatures and digital certificates in common use today rely on public key cryptography—which was invented by researchers at Stanford and MIT in the late 1970's. Before public key cryptography, it was necessary to exchange a secret shared key in advance to provide secrecy and/or authentication of encrypted messages. Using public key cryptography, the public key of a public-private key pair can be disclosed and even widely published. Only those who posses the corresponding private key of the pair can decrypt messages encrypted using the public key. Public key cryptography has paved the way for a wide variety cryptographic techniques including for example secure digital signatures and digital certificates.

Digital signatures and certificates are examples of how cryptography can be used for authentication purposes, e.g., to prove that a message came from a particular person or that a particular person is who he says he is. On a simplistic level, a public-key certificate is someone's public key, digitally signed by a trustworthy person. The trustworthy person is usually referred to as a certifying authority (CA). By vouching for (and digitally signing) the public key and information about the key's owner, the certifying authority certifies that the information about the key's owner is correct and that the public key in fact belongs to the key's owner. Other parties can check with the certifying authority and use the public key—safe in the knowledge that the public key actually belongs to the person who claims ownership.

Certificates play an important role in a number of widely adopted public-key protocols including for example ISO's X.509 standard. And, as explained above, digital signatures and certificates are used by JAVA virtual machines to authenticate JAVA applets before granting the applets the right to access local resources such as the local disk. Many web browsers allows an applet more or less access to local system resources based on the applet's digital signature. The signature can include the source of the applet, an identification of the user who created it, the name of the originating host, and/or other information.

There are now companies in the business of acting as certifying authorities and/or distributing products that allow others to act as certifying authorities. These companies can act as a "root" (ultimate) certifying authority that delegates the power to issue subsidiary certificates to others. The "root" certifying authority ultimately stands behind each of the various certificates issued under the authority of the "root" certificate. Such a "chain of trust" can have many links, and can form a hierarchy of certificates all tracing back to a root certificate.

The widespread deployment of public key cryptography and digital certificates has provided many benefits. However, one feature of the current public key scenario is that deployments of the Public Key Infrastructure (PKI) have generally been homogeneous. This means that one format and type of certificates (i.e., those provided by VeriSign, Inc.) is used throughout the infrastructure, and one public key algorithm (i.e., the one provided by RSA Data Security, Inc.) is used throughout the infrastructure. A platform that participates in this infrastructure can securely communicate with other entities and services on the network that participate in the PKI—by following a chain of trust that eventually terminates with the platform knowing the public key of the root certifying authority in the PKI hierarchy. However, a client running on this platform cannot communicate securely with a server that does not support this same public key infrastructure because it cannot verify the server's identity—since the server's trust chain does not include the root certifying authority. This scenario can create problems in terms of interoperability.

Figure 1:
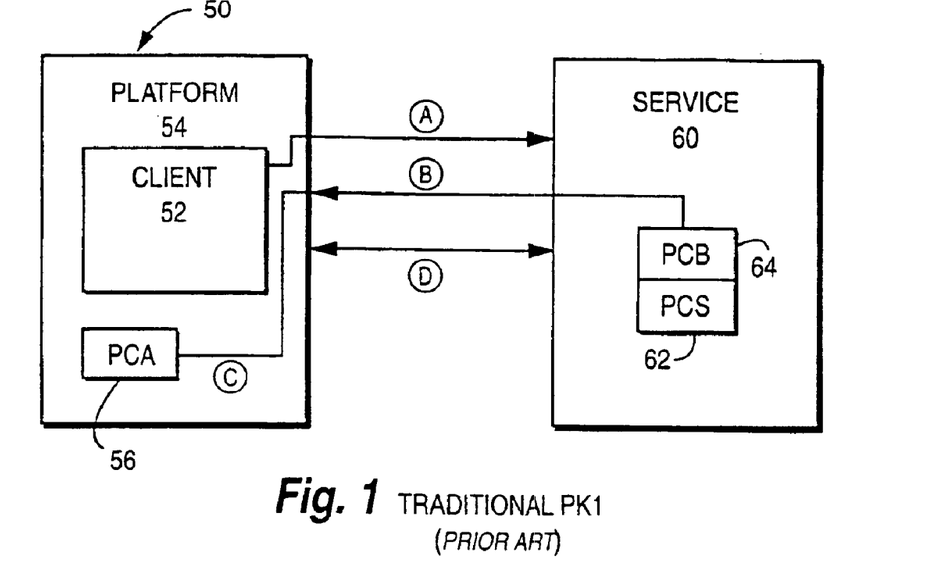
FIG. 1 is a schematic illustration of a conventional homogenous public key infrastructure.

FIG. 1 shows an example of an instance of a conventional Public Key Infrastructure (PKI) 50. In the traditional PKI instance 50 of FIG. 1, a client 52 runs on a platform 54. As one example, client 52 might comprise a JAVA application running within a virtual machine under a web browser on a local area network coupled to the Internet, a corporate Intranet, or some other distributed or other computer network. Client 52 knows (or can find out via the network) the root public key of a certifying authority (PCA) 56 (for example, it may possess a certificate issued by this certifying authority). A service 60 has a public key certificate chain of trust that begins with its own certificate (PCS) 62 and ultimately is certified (signed) by this same root certifying authority (PCA) 56.

Generally, there are at least two ways a client 52 such as a JAVA applet running under a platform 54 such as a web browser can initiate a network connection. The client 52 can request the platform 54 to make the connection for it; or the client can make the connection directly. If the platform 54 makes the connection, the protocol used on the connection is probably going to be limited to what the platform supports (e.g., HTTP in the case of a web browser). One advantage of having the platform 54 make the connection is that the platform's certificate store can be accessed and used. Having the client 52 make the connection itself provides more flexibility in what protocols can be used (i.e., the client is not limited to the particular protocols and/or functionality provided by the platform), but the client may not (and generally cannot, in the case where the platform is a web browser) have access to the platform's certificate store.

In more detail, one straightforward way to make a secure connection with the server 60 is for client 52 to initiate the following process:

A) Client 52 requests the platform 54 to make a secure connection with the service 60. Communication is initiated between platform 54 and service 60.

B) Service 60 responds with its certificate chain and other data needed to prove the server is the owner of its private key.

C) Platform 54 verifies the signatures of service 60 based on the certificate it has (or can get) from certifying authority (PCA) 56.

D) A secure channel is established between the platform 54 and server 60, with data being passed between client 52 and service 60.

Figure 2:
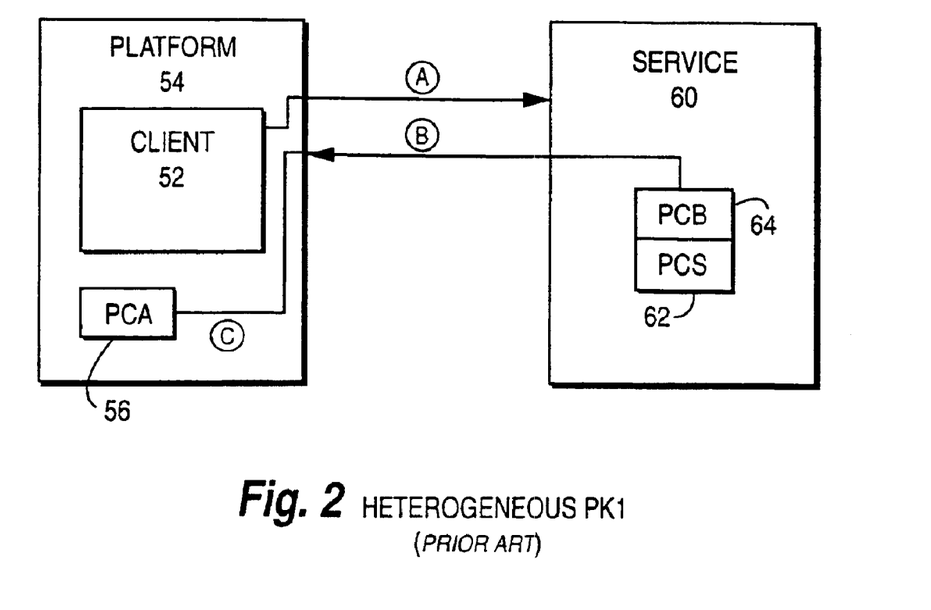
FIG. 2 is a schematic illustration of the FIG. 1 conventional heterogeneous public key infrastructure.

This scenario breaks down when the server 60 uses a public key (PCS) 62' issued and signed by a different certifying authority (PCB) 64 the platform 54 does not know or initiates connection directly without using the platform. The following happens (see FIG. 2):

A) Client 52 requests the platform 54 to make a secure connection with the service 60. Communication is initiated with the service.

B) The service 60 responds with its certificate chain and other data needed to prove the server is the owner of its private key.

C) The platform 54 cannot verify the signature generated by PCB 64 since it does not have that public key. Additionally, the platform 54 and service 60 may be using different public key algorithms and certificate formats— making verification even more impossible. A secure connection cannot be established.

There are several reasons why this is difficult problem. In the context of a JAVA® virtual machine using pure JAVA® code, it is impossible (due to security restrictions) to access the native certificate store in the web browser. In other words, as mentioned above, while it is certainly theoretically possible for the client 52 to establish the connection itself, it may not be able to access the platform 54's certificate store. Furthermore, the global PKI's deployed today are almost exclusively using RSA public key algorithms; if a server proposes to use an alternative public key algorithm (e.g., DSA), it cannot use the root certificates from well known certifying authorities such as VeriSign as part of its certificate chain. Also, the public key must be transmitted with its integrity intact.

In the case where client 52 is a JAVA applet distributed in an archive, one option might be to transfer the certificate with the applet to platform 54. This could be accomplished by creating a certificate database containing the server certificate, and then re-archiving and signing the database and client applet 52 with a key that has a public key certificate from a well known certifying authority such as VeriSign. This process is undesirable because it is difficult and prone to errors. It also means that the repacked database distributed with client 52 will only be able to work with one server 60.

Another option might be to require the applet and certificate to be transmitted over a secure (e.g., SSL) session between the platform 54 and the service 60. This would work, but is undesirable because such secure sessions increase the amount of loading and overhead on the service 60 for each connection.

Another option might be to require the end user to download the certificate separately and save it to the right place for client 52 to access it. This is undesirable because the end-user may not know where to save the certificate for it to be useful to the client 52 (for example, the location of the certificate may be dependent on the particular JAVA virtual machine). Furthermore, asking a user to perform such a step manually creates more work on the part of the user, and many users will not have the time, patience or expertise to perform the operation correctly.

Thus, there is a need to provide an efficient, automatic way to provide a client platform with a digital certificate it does not already have, so it is able to authenticate a downloaded digitally signed item such as a signed JAVA archive.

The present invention solves this problem by supplying a method and apparatus to securely transmit, verify and store the server's certificate on the client's platform.

In accordance with an aspect of an exemplary illustrative non-limiting implementation, a connection is established between a server and a web browser having access to a first, trusted public key. The server downloads a digitally signed item to the browser, the item including a second public key. This download operation need not be over a secure connection since the item is digitally signed and thus can be tested for authenticity and integrity. The browser verifies the digitally signed item using the first public key, and stores the item containing the second public key in response to the verification. An applet then uses the stored second public key to authenticate the server and establish a secure connection with the server. One example of such an item is a JAVA archive.

In accordance with a further aspect, a connection is established between a client platform and a service by downloading a digitally signed applet from the service to the client platform. The client platform verifies the digitally signed applet using a first public key the client platform already knows and trusts. The client platform executes the applet, thereby controlling the client platform to store a second public key corresponding to the server. The client applet uses this stored second public key to authenticate the service and establish the secure connection. In this particular example, it is the client itself that actually uses the key to establish the secure connection.

In accordance with another aspect, the applet includes first program code that controls the client platform to store the second public key to a non-volatile memory such as a disk. The applet may further include second program code that controls the client platform to retrieve the stored second public key to verify a signature subsequently provided by the server.

In accordance with a further aspect, the applet may control the client platform to store a second public key in the form of a digital certificate corresponding to the server; receive a digital signature from the server; and authenticate the received digital signature under control of the executing applet through use of the stored digital certificate corresponding to the server.

In accordance with a further aspect, the executing applet may invoke a further applet to establish a secure connection.

In accordance with yet another aspect, the applet comprises a signed JAVA Archive containing a digital certificate corresponding to the server, and a program fragment that stores the digital certificate in a predetermined location on the client platform that permits the client platform to later retrieve the stored digital certificate.

In accordance with yet another aspect, a client platform for establishing a secure connection with a service over a network comprises
  an applet receiver that receives a digitally signed applet from the service over the network; an applet verifier that verifies the digitally signed applet using a first public key the client platform already knows and trusts;
  an applet executor that executes the applet, thereby controlling the client platform to store a second public key corresponding to the server in a known location, and uses the stored second public key to authenticate the service and establish the secure connection; and
  an applet executor that executes a second applet, thereby controlling the client platform to retrieve the previously stored second public key and uses it to authenticate the service and establish the secure connection.

In accordance with yet another aspect, a first server for distributing applets comprises an applet transmitter that transmits a digitally signed applet to the client over the network, the applet being digitally signed using a first public key the client already knows and trusts, the applet including a program that controls the client to store a second public key corresponding to the same or different server. The client can use the second public key to, for example, establish a secure connection with the first server and/or with a further server.

In accordance with yet another aspect, a server for establishing a secure connection with a client comprises a digital credential transmitter that transmits a digital credential to the client executing the applet, the digital credential being authenticatable by the second public key.

The following is a non-exhaustive list of features and advantages provided by exemplary illustrative non-limiting implementations:

The archive created can be transmitted over any insecure connection since it is integrity protected and authenticated.

The store code archive stores the certificate in an area where the client can access and use it.

The verify code archive can contain code that will perform certificate validation for the client. This enables the client to handle certificate types it does not know about.

The client can make a secure direct connection to the server without having to access certificate stores on the platform.

BRIEF DESCRIPTION OF THE DRAWINGS

These and other features and advantages provided by exemplary illustrative non-limiting implementations will be better and more completely understood by referring to the following detailed description of preferred embodiments in conjunction with the drawings of which.

DETAILED DESCRIPTION OF PRESENTLY PREFERRED EXAMPLE EMBODIMENTS

Figure 3:
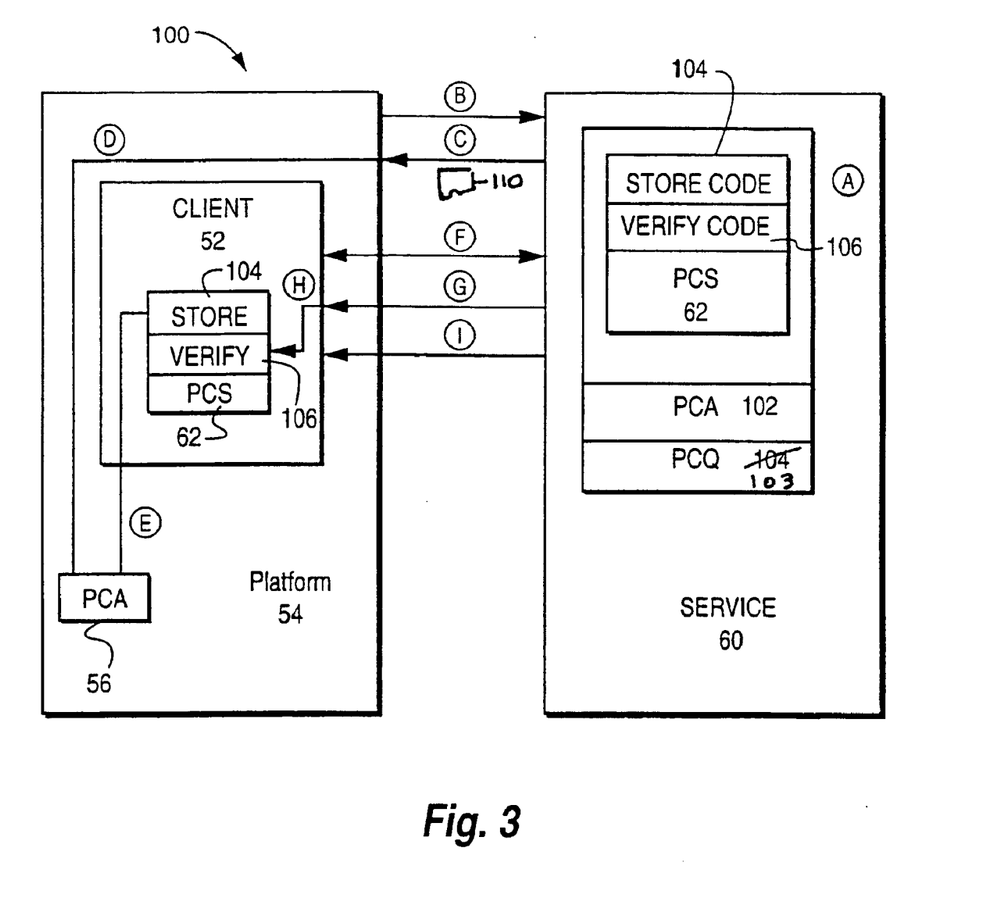
FIG. 3 is a schematic illustration of a preferred example embodiment provided by the present invention.

FIG. 3 is a schematic diagram of an example preferred embodiment 100. As in prior art FIG. 1, arrangement 100 includes a platform 54 (e.g., a personal computer including a web browser coupled to a digital network) that knows and trusts a certificate 56 issued by a certifying authority, providing a client 52 and a service 60 (e.g., one or more web servers or other network servers). Service 60 may, in one embodiment, comprise a single network node or server and, in another embodiment, may include two or more network nodes or servers. For example, the server for distributing certificate archives may be different from the server for making secure connections, or they may be the same server.

The preferred embodiment introduces several additional entities. First there is an additional key (PCQ) 103 that is certified by PCA 56. There is also a program 104 (e.g., object code) that is usable to store a certificate (Store Code) and a program 106 (e.g., object code) that can be used to verify the signature on data given a certificate (Verify Code).

Figure 5:
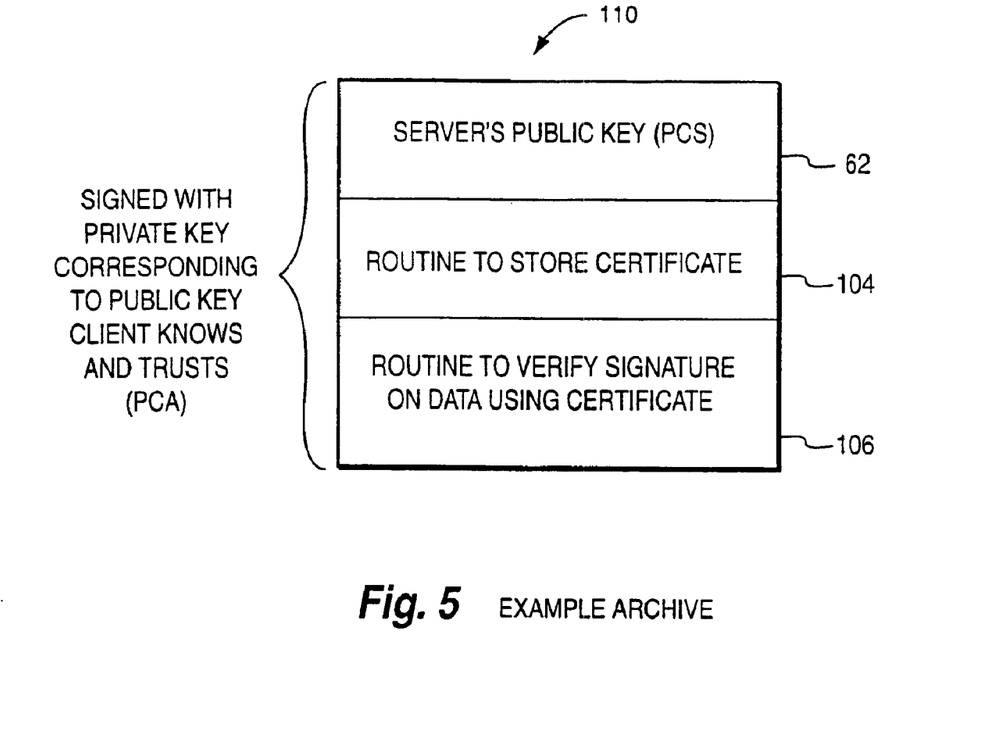
FIG. 5 shows an example certificate applet.

Referring to FIG. 5, service 60 creates an archive (e.g., a JAVA Archive, or "JAR") 110 containing the store code 104, the verify code 106, and the server's public key (PCS) 62. The private key corresponding to PCQ 104 signs the archive. PCQ 104 has a certificate chain that ends in certifying authority/certificate PCA 102. All of this activity is indicated by the "A" indication in FIG. 3.

Referring to FIG. 3, next, the archive 10 is requested by the platform 54 ("B"). The server 60 responds by sending the archive 10 to the client platform 54 ("C"). Note that the server 60 providing the archive may be a different server from the one establishing a secure connection with the client 52.

At the client platform, the signature on the archive 110 is verified to be trusted by PCA 56 ("D"). The platform 54 (which may be a JAVA virtual machine running in a web browser) executes the store code 104 contained in the archive 110 to store the certificate 62 and the verify code 106 where the client can access them ("E").

Client 52 then initiates a connection directly with the server 60 ("F"), which may be different than the service that distributed the applet. The server 60 responds with a digital credential (i.e., PCS 62 and any other data needed) to prove the server is the owner of its private key ("G"). In the preferred embodiment, the client 52 either verifies the signature on the data directly, or uses the "verify" class to do this ("H"). Secure communication is then established based on the verification of the server's credential ("I").

Figure 4:
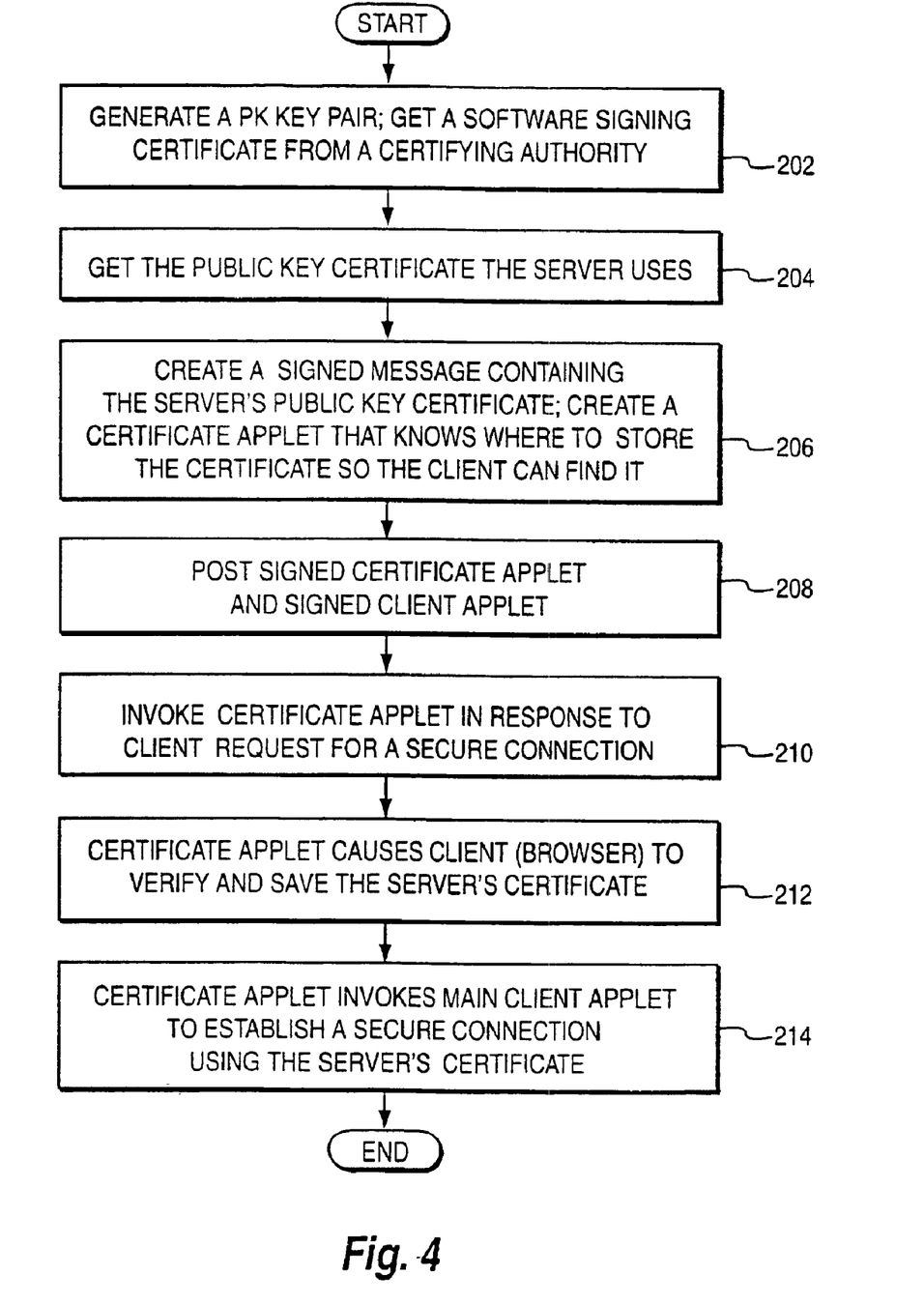
FIG. 4 is a flowchart of example steps performed by the FIG. 3 preferred embodiment.

One example embodiment uses SSL/TLS to create a secure session between a JAVA applet client 52 and a proxy server 60. In this example embodiment, the DSA public key algorithm is used to authenticate the applet 52 to the server 60. In order for this to be secure, the applet 52 must be able to verify the public key of the server 60. In this solution, the server's certificate is used with an archive file that contains an applet. The applet knows where to store the certificate so the client can access it. FIG. 4 is a flowchart showing example steps performed by this process:

The administrator generates a public key (e.g., RSA) pair, and obtains a software-signing certificate from a well known certifying authority such as VeriSign or Thawte (block 202).

The administrator obtains the public key certificate for the public key used on the server (e.g., DSA) (block 204).

The administrator uses the utilities provided to create a JAVA archive containing the server's DSA certificate and an applet that knows where to store the certificate (block 206). This archive is signed with the administrator's RSA software signing key obtained in block 202.

The administrator uses the deployment tools to create a certificate webpage that invokes the certificate applet and tells the applet what page to invoke to invoke the applet. These pages are copied up to the web server (block 208).

When the end user wants to make a secure connection with the client, a "download the certificate webpage" invokes the certificate applet (block 210).

The certificate applet tries to save the server's DSA certificate to disk—which causes the JAVA virtual machine in the client browser to check signature made with the administrator's RSA key (block 212). Since the administrator has a public key from a well known certifying authority, the signature is verifiable. If the signature is verified, the JAVA virtual machine allows the applet to save the server's DSA certificate to the local disk where the client can find it.

The certificate applet then invokes the page that invokes the main client applet (block 214). The client applet can then make a secure connection (block 214).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method for establishing a secure network connection between a web browser on a client and a service, said web browser having a virtual machine, said web browser having access to a first key, said client web browser and virtual machine being of the type that downloads and executes applets while protecting against at least some client resources from being updated based on said applet execution, said method comprising:

establishing an insecure network connection with said client web browser;

downloading, over said insecure connection, at least one digitally signed applet to the client web browser, said at least one applet including: (a) a second key, (b) code executable on the client virtual machine to cause the client to store the second key, and (c) code executable on the client virtual machine to use the stored second key to establish a secure network connection with said service;

before the client virtual machine executes the digitally signed applet, verifying the digitally signed applet at the client using the first key;

executing the downloaded applet code with the client virtual machine, thereby causing the client to store the second key corresponding to the service; and further executing said at least one applet to cause said at least one applet to use the stored second key to authenticate the service and establish the secure network connection with the service.

2. The method of claim 1 wherein the applet further includes program code that controls the client to use the stored second key to verify a signature subsequently provided by the server.

3. The method of claim 1 wherein the executing step includes controlling the client virtual machine to store, at the client, the second key in the form of a digital certificate corresponding to the server, and the further executing step comprises receiving a digital signature from the server, and authenticating the received digital signature under control of the executing applet through use of the stored digital certificate corresponding to the server.

4. The method of claim 1 wherein the further executing step includes having the executing applet invoke a further applet to establish a secure connection.

5. The method of claim 1 wherein the applet comprises a signed Archive containing a digital certificate corresponding to the server, and a program fragment that stores the digital certificate in a predetermined location on the client that permits the client to later retrieve the stored digital certificate.

6. The method of claim 1 wherein the applet includes a second key payload and further includes first program code that controls the client to store the second key to a non-volatile memory.

7. The method of claim 6 wherein the non-volatile memory comprises a disk.

8. The method of claim 6 wherein the applet further includes second program code that controls the client to use the stored second key to verify a signature subsequently provided by the server.

9. A web browser on a client for establishing a secure network connection with a service over a network, said client web browser including a virtual machine, said client web browser and virtual machine being of the type that downloaded and execute applets while protecting against at least some resources of said client from being updated by said applet execution, said client comprising:

an applet receiver that receives at least one digitally signed applet from the service over an insecure network connection, said at least one applet including: (a) a key, (b) code executable on the client virtual machine to cause the client to store the key, and (c) code executable on the client virtual machine to establish a secure network connection with said service, said applet being executed by the client virtual machine to cause the client to store the key delivered with the applet, the stored key allowing authentication between the client and the service;

wherein the client web browser includes an applet verifier that, before executing the applet, verifies the digitally signed applet using a key different from the key delivered with the applet;

wherein the client virtual machine further includes an applet executor that executes the applet, thereby controlling the client to store the key delivered with the applet, said delivered key corresponding to the server, and uses the stored delivered key to authenticate the server and establish a secure network connection between the client and the server.

10. A method for establishing a secure network connection with a web browser on a client, said client web browser including a virtual machine and having access to a first key, said client web browser and virtual machine being of the type that download and execute applets while protecting at least some of client resources from being affected by said applet execution, the method comprising:

downloading, over an insecure network connection, at least one executable applet to the client virtual machine, said at least one applet including: (a) a second key corresponding to the server, (b) code executable on the client virtual machine to cause the client to store the further key corresponding to the server, and (c) code executable on the client virtual machine to establish a secure network connection with said server, the digitally signed applet being digitally signed such that the client virtual machine can verify the digitally signed applet using the first key, the at least one digitally signed applet including the further key and code executable by the client virtual machine that controls the client virtual machine to store the further key;

sending a digital credential to the client, said digital credential being verifiable by the client applet using the stored further key delivered with the at least one applet; and establishing a secure network communication with the executing client applet based on said digital credential as verified by the client applet.

11. The method of claim 10 wherein the applet further includes further code that controls the client to use the stored further key to verify the digital credential.

12. The method of claim 10 further including sending a further applets to the client in response to an invocation of the further applet by the at least one applet.

13. The method of claim 10 wherein the applet comprises a signed Archive containing a digital certificate, and a program fragment that stores the digital certificate in a predetermined location on the client that permits the client to later retrieve the stored digital certificate.

14. The method of claim 10 wherein the applet code controls the client to store the further key to a non-volatile memory.

15. The method of claim 14 wherein the non-volatile memory comprises a disk.

16. A server for establishing a secure network connection with a web browser on a client over a network, said client having resources including the web browser and a virtual machine, said client web browser and virtual machine being of the type that download and execute applets while protecting at least some of said client resources from being affected by said applet execution, said server comprising:

an applet transmitter that transmits at least one digitally signed applet to the client over an insecure network connection, the at least one applet being digitally signed using a first key the client possesses independently of the applet, said at least one applet including: (a) a second key corresponding to the server, (b) code executable on the client virtual machine to cause the client to store the second key, and (c) code executable on the client virtual machine to establish a secure network connection with said server, the applet being executable by the client virtual machine to control the client to store the second key corresponding to the server;

a digital credential transmitter that transmits a digital credential to the client executing the applet, the digital credential being authenticatable by the client using the second key; and a secure network connector that establishes a secure network connection with the client under control of the executing applet and based at least in part on the digital credential being authenticated by the second key delivered over the insecure network connection.

17. A method for establishing a secure network connection between a server and a web browser on a client having access to a firstkey and also having a virtual machine, said web browser and virtual machine downloading and executing applets while protecting resources from being updated by said applet execution, said method comprising:

downloading, to the browser over an insecure network connection, at least one digitally signed applet, the applet including: (a) a second key associated with the server, (b) code executable on the client virtual machine to cause the client to store the second key, and (c) code executable on the client virtual machine to establish a secure network connection with said server;

verifying the digitally signed applet at the browser using the first key;

executing the applet with the virtual machine to cause the client to store the second key;

using the stored second key to authenticate a further credential delivered by the server; and based on said authentication of the said further credential, establishing, under control of the executing applet, a secure network connection between the web browser and the server.

18. A method as in claim 17 wherein the applet comprises an archive.

* * * * *